United States Patent [19]

Nifong et al.

[11] Patent Number: 4,997,174
[45] Date of Patent: Mar. 5, 1991

[54] BARSTOCK LOCATING DEVICE

[75] Inventors: Jacob F. Nifong, Winston-Salem; William E. Kiger, Germanton; James R. Lippart, Pfafftown; John W. Blount, Winston-Salem, all of N.C.

[73] Assignee: Westinghouse Electric Corp., Pittsburgh, Pa.

[21] Appl. No.: 466,099

[22] Filed: Jan. 16, 1990

[51] Int. Cl.$^5$ .............................................. B25B 1/24
[52] U.S. Cl. ................................................. 269/270
[58] Field of Search ...................... 142/53; 144/209 R; 82/165, 150, 151, 170, 126, 127; 279/1 L; 409/174; 269/217, 309, 310, 265, 270

[56] References Cited

U.S. PATENT DOCUMENTS

| | | | |
|---|---|---|---|
| 3,273,611 | 9/1966 | Hagquist et al. | 82/165 |
| 4,664,003 | 5/1987 | Avery | 82/165 |
| 4,667,549 | 5/1987 | Griffin | 82/165 |
| 4,702,132 | 10/1987 | Grasse | 82/165 |

Primary Examiner—Robert C. Watson

[57] ABSTRACT

A workpiece positioning system for a machine (34) which is supplied by a robotic transfer mechanism, the system being composed of:

a workpiece (2) in the form of a length of barstock having a longitudinal dimension and two opposed longitudinal ends (8), with each end (8) being provided with at least one recess (10) having surfaces (16,18) which are inclined to the longitudinal dimension;

a locating device (20) having components for securing the device in a defined position to the machine (34); and a workpiece engaging device (24) secured to the locating device (20) in a defined position relative to the locating device (20) and having a projecting portion (26) provided with positioning surfaces (50,52) corresponding to the surfaces (16,18) of the recess (10) at a respective end (8) of the workpiece (2) and engageable with the corresponding surfaces (16,18) for bringing the respective end (8) of the workpiece (2) to a defined position relative to the engaging device (24).

18 Claims, 4 Drawing Sheets

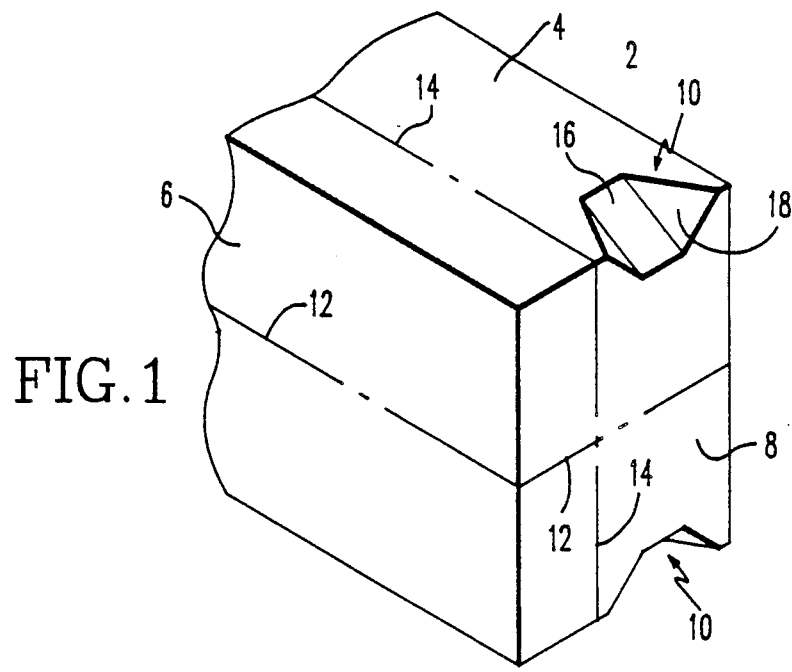
FIG. 1
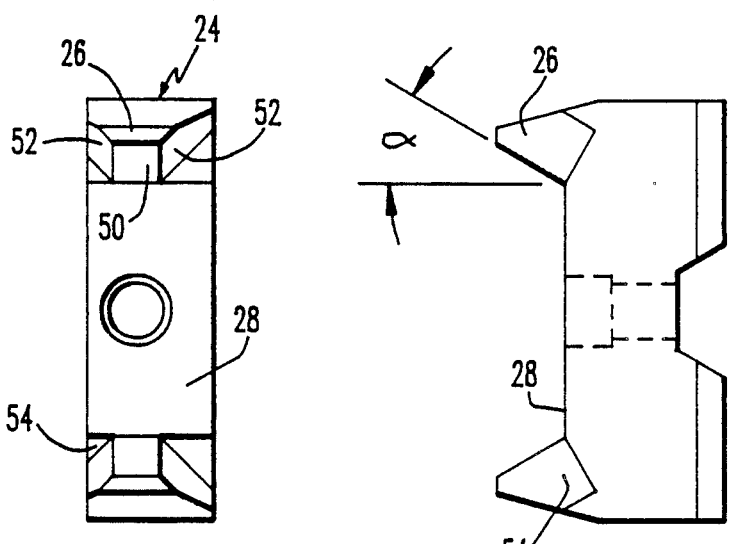
FIG. 3a
FIG. 3b
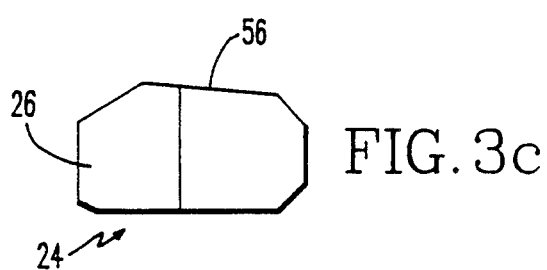
FIG. 3c

BARSTOCK LOCATING DEVICE

BACKGROUND OF THE INVENTION

The present invention relates to a device for accurately positioning a barstock workpiece which is delivered to a machining device by a robotic loading mechanism.

In order to satisfactorily employ robotic mechanisms for transferring workpieces from one machine to another, particularly if close manufacturing tolerances are to be maintained, it is essential that the positioning of a workpiece at each successive machine be achieved with a high degree of accuracy and repeatability. State-of-the-art robotic mechanisms are not capable of themselves positioning a workpiece with the degree of accuracy and repeatability required by many manufacturing operations, such as in the fabrication of turbine rotor blades.

SUMMARY OF THE INVENTION

It is a primary object of the present invention to provide a system which will bring a workpiece to the requisite position for the intended machining operation.

Another object of the invention is to provide a system which is capable of establishing the requisite workpiece position and of accepting the workpiece from a robotic transfer mechanism which will bring the workpiece to approximately the desired position, but with some positional variation from one delivery cycle to the next.

A further object of the present invention to provide a system which can cooperate with existing robotic transfer mechanisms to bring a workpiece into the require processing position with a high degree of accuracy and repeatability.

Another object of the invention is to provide a system which will effect automatic positioning of a workpiece delivered by a robotic transfer mechanism.

Still another object of the invention is to provide a system having interchangeable workpiece engaging devices for accommodating workpieces having a plurality of sizes.

The above and other objects are achieved, according to the present invention, by a workpiece positioning system for a machine which is supplied by a robotic transfer mechanism, comprising:

a workpiece in the form of a length of barstock having a longitudinal dimension and two opposed longitudinal ends, with each end being provided with at least one recess having surfaces which are inclined to the longitudinal dimension;

a locating device having means for securing the device in a defined position to the machine; and a work piece engaging device secured to the locating device in a defined position relative to the locating device and having a projecting portion provided with positioning surfaces corresponding to the surfaces of the recess at a respective end of the workpiece and engageable with such corresponding surfaces for bringing the respective end of the workpiece to a defined position relative to the engaging device.

BRIEF DESCRIPTION OF THE DRAWING

FIG. 1 is a perspective view of one end of a piece of barstock formed to constitute a workpiece according to the present invention.

FIGS. 3a, 3b and 3c are, respectively, front, side and end views of the workpiece engaging device of the system of FIG. 2.

DESCRIPTION OF THE PREFERRED EMBODIMENTS

Figure 2:
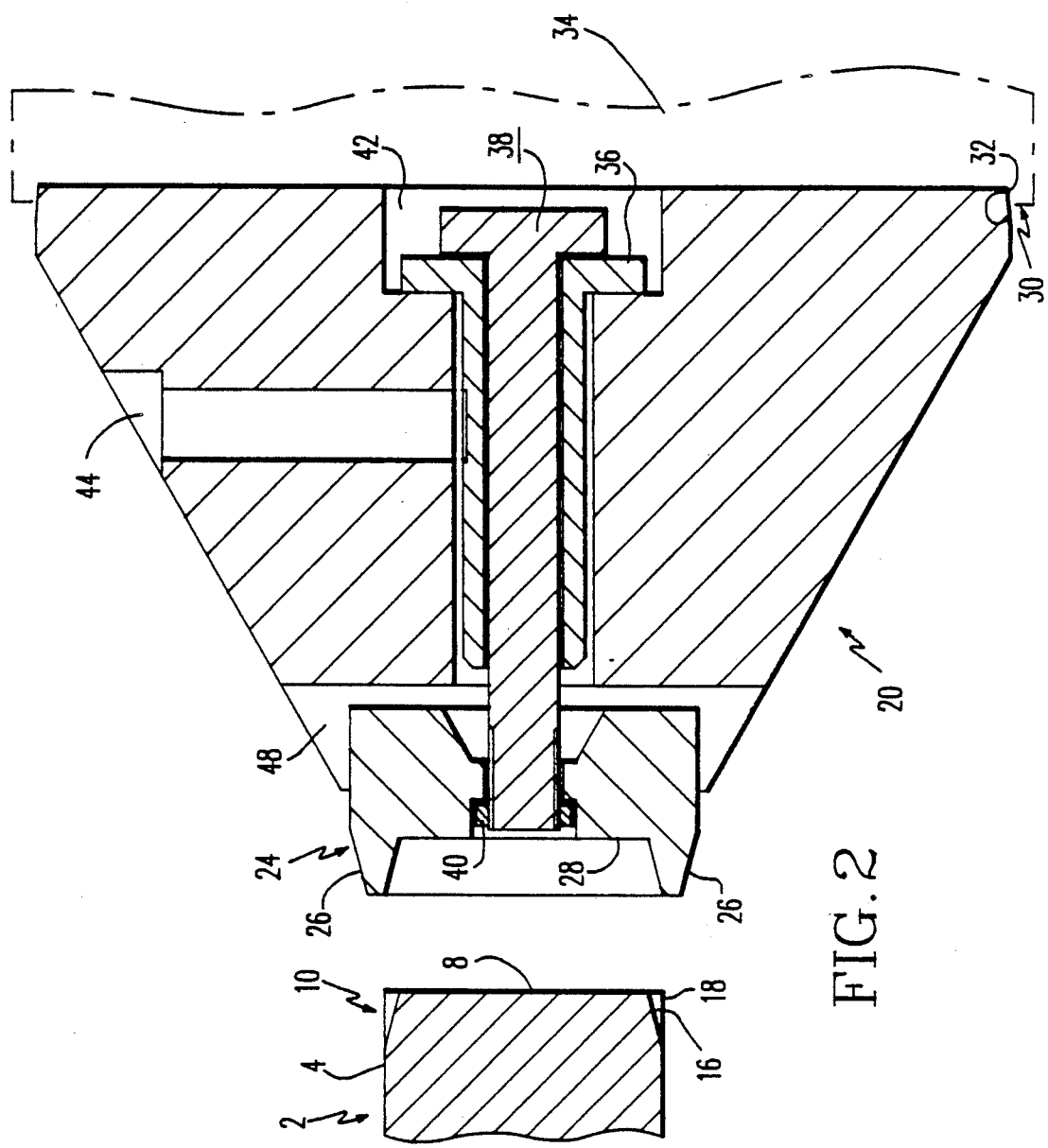
FIG. 2 is a cross-sectional view of a preferred embodiment of a system according to the present invention.

FIG. 1 illustrates a simple workpiece in the form of a length of barstock 2 which has not yet been subjected to any of the machining operations required for creation of a manufactured piece, such as a turbine rotor blade. Barstock 2 is shown to be a piece of simple rectangular cross section, although other cross sections can be employed, depending on the configuration of the part to be manufactured.

Stock 2 has an upper horizontal longitudinal surface 4, a vertical longitudinal side surface 6 and a vertical end surface 8.

Prior to the start of manufacture, stock 2 has been provided at each longitudinal end with two locating recesses 10. Normally, an identical pair of locating recesses will be provided at the opposite end of stock 2 (not shown). Each recess 10 extends between end surface 8 and a respective horizontal longitudinal surface of stock 2, and the two recesses 10 at each end of stock 2 are separated from one other by a portion of end surface 8.

FIG. 1 additionally illustrates two lines defining a horizontal longitudinal plane 12 and two lines defining a vertical longitudinal plane 14 which are notional reference planes associated with stock 2.

Each recess 10 includes a central surface 16 which forms an acute angle with plane 12 and is perpendicular to plane 14, and two lateral surfaces 18 each of which forms an acute angle with each of planes 12 and 14 and an obtuse angle with its associated surface 16. As will be described in greater detail below, surfaces 16 and 18 and the portion of end surface 8 between recesses 10 cooperate with a workpiece engaging device according to the present invention to position stock 2 in a machine with a high degree of accuracy.

One embodiment of a complete system according to the present invention is shown in FIG. 2 in position to engage one longitudinal end of barstock 2 of FIG. 1. The system includes, in addition to barstock 2, a locating device in the form of a locator cone 20 and a workpiece engaging device in the form of a gripper insert 24 provided with two gripper fingers 26 which will engage in recesses 10 when insert 24 engages the associated longitudinal end of bar 2.

As will be explained in greater detail below, fingers 26 are dimensioned and positioned to engage lateral surfaces 18 of recesses 10 while the portion of end surface 8 which extends between recesses 10 is spaced a small distance from a surface 28 of insert 24 which is located between fingers 26.

Locator cone 20 is provided, at its large diameter end, with a cylindrical base 30 having a tapered portion 32. Base 30, and particularly tapered portion 32, is arranged to be seated in a holding fixture 34 of a machine which is to operate on stock 2. For this purpose, base 30 will be force fitted into machine fixture 34 so as to be positioned relative to the machine with a high degree of accuracy.

Cone 20 is provided with a central longitudinal passage in which is seated a pin 36 having an enlarged head and a longitudinal through bore. A clamping screw 38 having an enlarged head extends through the longitudinal bore in pin 36 and through a central longitudinal bore provided in gripper insert 24. Gripper insert 24 is additionally provided with a countersunk recess for receiving a nut 40 which threadedly engages the threaded end of screw 38. The heads of pin 36 and screw 38 are located within a countersunk recess 42 provided in the base of cone 20. Cone 20 is further provided with a threaded lateral bore 44 for receiving a set screw which will engage in a shallow recess in the outer lateral surface of pin 36 to hold pin 36 securely in position in cone 20.

Cone 20 is further provided, at its small diameter end, with a transverse slot 48 for receiving insert 24. As will be explained in greater detail below, slot 48 and insert 24 are configured to assure that insert 24 is locked in an accurately defined position relative to cone 20.

In operation, stock 2 will be brought to the associated machine by a robotic transfer device so that each end of stock 2 is located in the vicinity of an associated gripper insert 24. The machine will then be operated to move fixture 34 toward barstock 2 into a gripping position in which each insert 24 comes to engage the recesses 10 at a respective end of stock 2. Any inaccuracies in the positioning of stock 22 by the robotic transfer device will be eliminated by the camming action of fingers 26 on surfaces 16 and 18 of recesses 10.

The structure of a preferred embodiment of gripper insert 24 is shown in detail in FIGS. 3a, 3b and 3c.

FIG. 3a is a front elevational view which shows that each finger 26 has a central sloping surface 50 disposed to mate with surface 16 of a recess 10 and two lateral surfaces 52 disposed to mate with lateral surfaces 18 of the same recess 10. FIG. 3a additionally illustrates the through bore for passage of screw 38 shown in FIG. 2.

To the side of each finger 26, insert 24 is provided with a respective recessed region 54 which results from the grinding of the adjacent surface 52.

FIG. 3b is a side elevational view and FIG. 3c is an end view of insert 24, FIG. 3b showing that surface 50 of each finger 26 extends at an angle α to the longitudinal direction of barstock 2.

The inclinations and relative positions of surfaces 16 and 18 of recesses 10, and the corresponding inclinations of surfaces 50 and 52 of fingers 26 are selected to assure that when insert 24 is moved in a direction to engage an associated longitudinal end 8 of barstock 2, the forces produced by the relative longitudinal movement will produce a camming action which causes surfaces 16 and 18 to move along surfaces 50 and 52 in order to bring barstock 2 vertically and horizontally precisely to the desired position. While this can be achieved with inclinations which vary over a certain range, it is preferred that the inclination α of each surface 16 and 50, relative to the longitudinal direction of barstock be of the order of 30° and that the inclination of each surface 18 be of the order of 55° relative to the associated surface 16 in a plane normal to both surfaces 16 and 18. When insert 24 is brought into engagement with an associated end of barstock 2, surfaces of insert 24 will engage surfaces 18 of barstock 2 to precisely position barstock 2 along both planes 12 and 14 (FIG. 1).

It has been found that the most accurate positioning is achieved if, in the final position of each insert 24, the only mating engagement is between surfaces 18 and 52. To assure this, each insert is dimensioned so that a small clearance will be established between surfaces 50 and 16 and between surfaces 8 and 28 when barstock 2 is in the desired final position relative to inserts 24.

Further, FIGS. 3b and 3c illustrate that the side of insert 24 remote from fingers 26 is chamfered. In addition, as shown particularly in FIG. 3c, one longitudinal side 56 of insert 24 slopes away from the other longitudinal side in the direction toward fingers 26. The purpose of this slope will be described below with reference to FIGS. 4a, 4b and 4c, which illustrate one embodiment of locator cone 20.

Figure 4C:
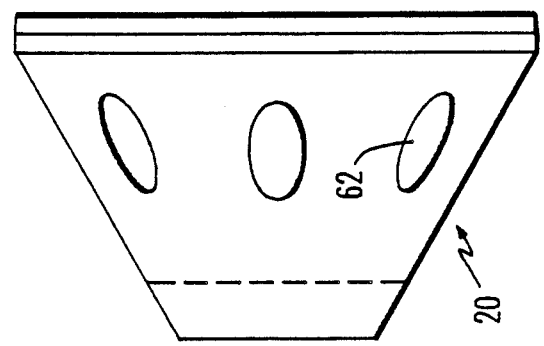
FIGS. 4a, 4b and 4c are, respectively, a first side view, a front view and a second side view of the locating device of the system of FIG. 2.
Figure 4A:
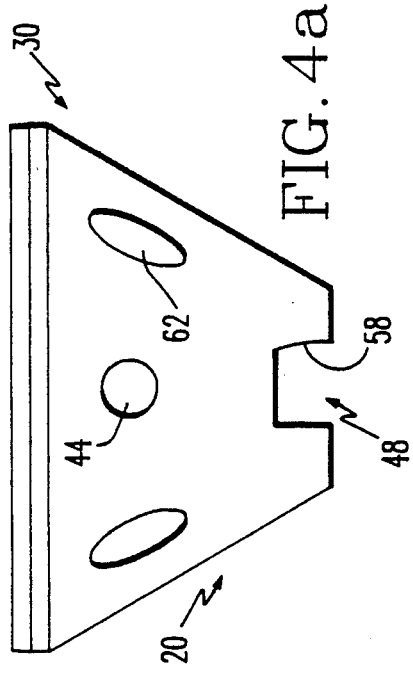
Figure 4B:
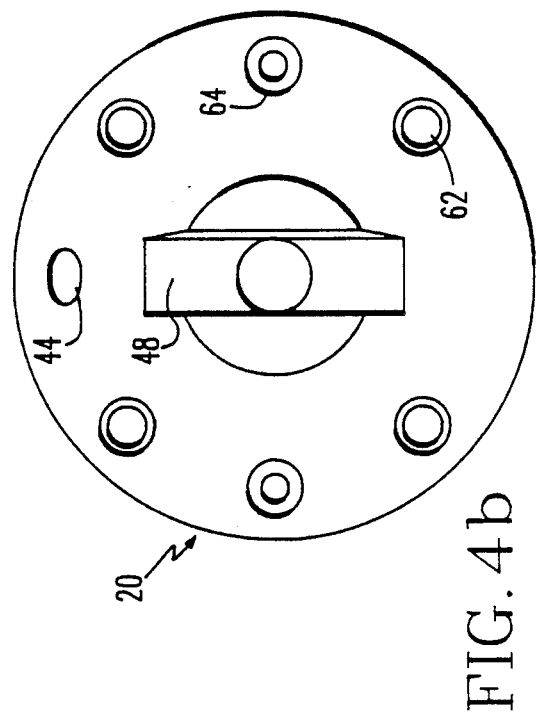

As shown in FIGS. 4a and 4b, slot 48 in cone 20 is provided with an outwardly sloping surface 58 at the side of slot 48 which will contact side 56 of insert 24. The slope of surface 58 is made slightly less than the slope of side 56 to assure that when insert 24 is inserted into slot 48, insert 24 will be tightly wedged in slot 48 in the region adjacent the small diameter end of cone 20, i.e. at the outer end of slot 48. This helps to assure accurate positioning of insert 24 in slot 48.

According to one embodiment of the invention, the slope of surface 58 could be of the order of 7°, while side 56 of insert 24 could have a slightly greater slope, for example of the order of 7° 7′.

The position of insert 24 relative to the longitudinal direction of slot 48, i.e. perpendicular to the plane of FIG. 4a, is assured by screw 38 and by the accurate positioning of pin 36 in cone 20 by means of the set screw in bore 44.

As further shown in FIGS. 4a, 4b and 4c, cone 20 is provided with four countersunk through bores 62 for receiving bolts or machine screws via which cone 20 is securely fastened to fixture 34 of the associated machine. In addition, since cone 20 will be wedged in place via tapered portion 32, forces for removing cone 20 from its associated machine fixture 34 can be generated by set screws which engage in countersunk, threaded through passages 64. When cone 20 is to be removed, set screws are inserted into threaded passages 64 and as they are threaded into those passages they press against a flat surface of machine fixture 34 to force cone 20 out of fixture 34.

It will be noted that locator cone 20, and particularly slot 48, is constructed to accept inserts 24 having a variety of dimensions, and particularly a variety of spacings between their associated teeth 26. Thus, a single cone can be employed for holding barstock pieces having a wide variety of dimensions.

The cone shape of device 20 is selected to provide a large area base which engages fixture 34, so that a stable connection having a high degree of deformation resistance is created, and to allow easy access to the fastening bolts in bores 62 and the set screws in passages 64.

Figure 5:
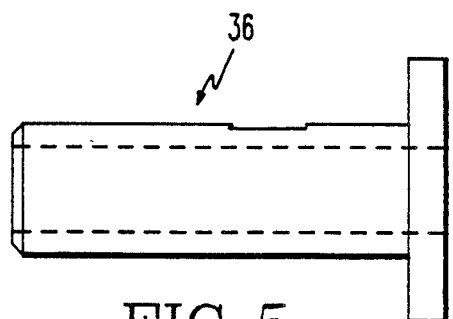
FIG. 5 is a side view of a further component of the system of FIG. 2.

FIG. 5 is a side elevational view showing pin 36 and its associated shallow groove 66.

Figure 6:
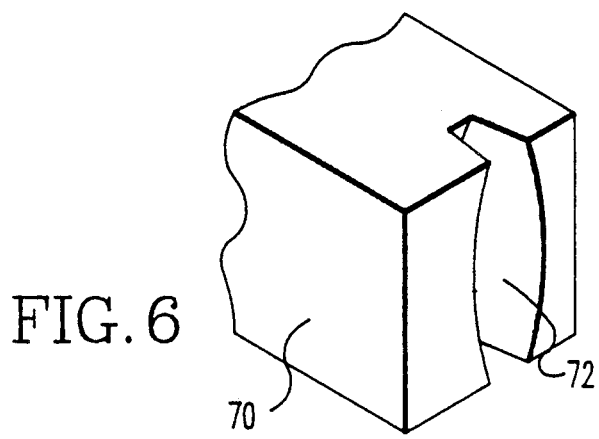
FIG. 6 is a perspective view of one end of a piece of barstock formed to constitute a workpiece according to a second embodiment of the present invention.
Figure 7:
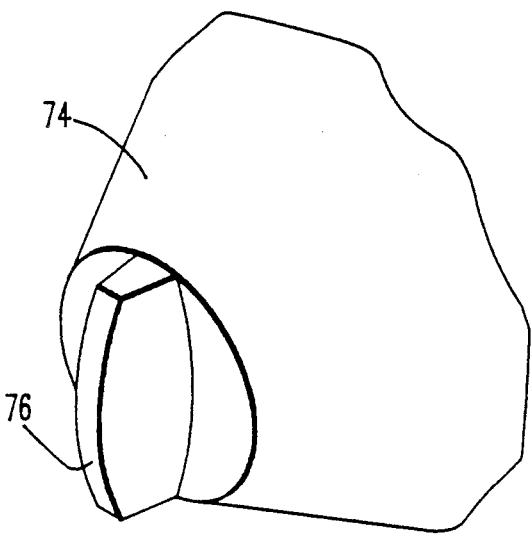
FIG. 7 is a perspective view of a second embodiment of a workpiece engaging device and locating device according to the invention for holding the workpiece of FIG. 6.

An alternative, less preferred, embodiment of the invention is shown in FIGS. 6 and 7. FIG. 6 illustrates one longitudinal end of a barstock 70 provided with a locating groove 72 extending between the upper and lower surfaces of barstock 70 and having a concave bottom and concave sides. FIG. 7 shows a support device for the barstock of FIG. 6, which device includes a locator cone 74 and a gripping insert 76.

Insert 76 has a convex forward edge and convex sides dimensioned to mate with the concave surfaces of groove 72. The concave sides of groove 72 and the convex sides of insert 76 taper somewhat, as shown for groove 72 in FIG. 6, in order to exert a positioning action in the horizontal direction. A positioning action is exerted in the vertical direction by interaction between the concave sides of groove 72 and the convex sides of insert 76.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A workpiece positioning system for a machine which is supplied by a robotic transfer mechanism comprising:
   a workpiece in the form of a length of barstock having a longitudinal dimension, two opposed longitudinal end surfaces, and two opposed longitudinal surfaces extending between said end surfaces along the longitudinal dimension of said workpiece, with each end surface being provided with two recesses having surfaces which are inclined to the longitudinal dimension, each said recess extending between a respective end surface and a respective one of said longitudinal surfaces;
   a locating device having means for securing said device in a defined position to the machine; and
   a workpiece engaging device secured to said locating device in a defined position relative to said locating device and having two projecting portions each provided with positioning surfaces corresponding to said surfaces of a respective recess at a respective end of said workpiece and engageable with said corresponding surfaces for bringing said respective end of said workpiece to a defined position relative to said engaging device.

2. A system as defined in claim 1 wherein said surfaces of each said recess include: a central surface which intersects the respective one of said longitudinal surfaces along a line perpendicular to said longitudinal dimension; and two lateral surfaces bordering said central surface and each forming an obtuse angle with said central surface, such that said central surface and said lateral surfaces intersect said respective end surface along lines forming the small base and the sides of a trapezoid.

3. A system as defined in claim 2 wherein said positioning surfaces of each said projection portion of said workpiece engaging device are oriented to each mate with a respective lateral surface of a respective recess.

4. A system as defined in claim 3 wherein said workpiece engaging device is constructed such that when said workpiece is in said defined position relative to said workpiece engaging device, said workpiece contacts said workpiece engaging device only via said lateral surfaces of said recesses.

5. A system as defined in claim 3 wherein said locating device is provided with a groove in which said workpiece engaging device is removably fixed.

6. A system as defined in claim 5 wherein said locating device has a front surface disposed to face said workpiece when said workpiece is engaged by said workpiece engaging device, and said groove is delimited by two opposed side walls which extend to said front surface and diverge from one another in the direction toward said front surface.

7. A system as defined in claim 6 wherein said workpiece engaging device has two opposed surfaces which contact said two opposed side walls of said groove and which diverge from one another to an extent to be substantially parallel to said side walls.

8. A system as defined in claim 7 wherein said two opposed surfaces diverge from one another at an angle which is slightly greater than the angle of divergence between said side walls of said groove, and said workpiece engaging device is dimensioned such that said opposed surfaces of said workpiece engaging device press against said opposed side walls of said groove at a location proximate to said front surface of said locating device.

9. A system as defined in claim 8 wherein: said groove in said locating device has a base; said locating device has a through bore extending to said groove base; said workpiece locating device has a through bore aligned with said through bore in said locating device; and said system further comprises a clamping bolt extending through said through bores and a fastener secured to said clamping bolt for clamping said workpiece engaging device in a predetermined position in said locating-device.

10. A system as defined in claim 9 wherein said locating device has the form of a conic frustum with a smaller diameter base directed toward said workpiece and a larger diameter base via which said locating device is secured to the machine.

11. A system as defined in claim 1 wherein said locating device is provided with a groove in which said workpiece engaging device is removably fixed.

12. A workpiece positioning system for a machine which is supplied by a robotic transfer mechanism, comprising:
   a workpiece in the form of a length of barstock having a longitudinal dimension and two opposed longitudinal dimension and two opposed longitudinal ends, with each end surface being provided with at least one recess having surfaces which are inclined to the longitudinal dimension;
   a locating device having means for securing said device in a defined position to the machine; and
   a workpiece engaging device secured to said locating device in a defined position relative to said locating device and having a projecting portion provided with positioning surfaces corresponding to said surfaces of said recess at a respective end of said workpiece and engageable with said corresponding surfaces for bringing said respective end of said workpiece to a defined position relative to said engaging device, wherein said locating device is provided with a groove in which said workpiece engaging device is removably fixed and wherein said locating device has a front surface disposed to face said workpiece when said workpiece is engaged by said workpiece engaging device, and said groove is delimited by two opposed side walls which extend to said front surface and diverge from one another in the direction toward said front surface.

13. A system as defined in claim 12 wherein said workpiece engaging device has two opposed surfaces which contact said two opposed side walls of said groove and which diverge from one another to an extent to be substantially parallel to said side walls.

14. A system as defined in claim 13 wherein said two opposed surfaces diverge from one another at an angle which is slightly greater than the angle of divergence between said side walls of said groove, and said workpiece engaging device is dimensioned such that said opposed surfaces of said workpiece engaging device press against said opposed side walls of said groove at a location proximate to said front surface of said locating device.

15. A system as defined in claim 11 wherein: said groove in said locating device has a base; said locating device has a through bore extending to said groove base; said workpiece locating device has a through bore aligned with said through bore in said locating device; and said system further comprises a clamping bolt extending through said through bores and a fastener secured to said clamping bolt for clamping said workpiece engaging device in a predetermined position in said locating device.

16. A system as defined in claim 15 further comprising a pin having a longitudinal bore, said pin being seated in said through bore and said clamping bolt extending through said longitudinal bore.

17. A system as defined in claim 16 further comprising a set screw held in said locating device for securing said pin in a defined position relative to said locating device.

18. A system as defined in claim 1 wherein said locating device has the form of a conic frustum with a smaller diameter base directed toward said workpiece and a larger diameter base via which said locating device is secured to the machine.

* * * * *